United States Patent
Itoi

(10) Patent No.: US 7,114,381 B2
(45) Date of Patent: Oct. 3, 2006

(54) FUEL FLOW RATE MEASURING APPARATUS FOR AN INTERNAL COMBUSTION ENGINE

(75) Inventor: Makoto Itoi, Tokyo (JP)

(73) Assignee: Mitsubishi Denki Kabushiki Kasiha, Tokyo (JP)

( * ) Notice: Subject to any disclaimer, the term of this patent is extended or adjusted under 35 U.S.C. 154(b) by 0 days.

(21) Appl. No.: 11/119,886

(22) Filed: May 3, 2005

(65) Prior Publication Data
US 2006/0156799 A1 Jul. 20, 2006

(30) Foreign Application Priority Data
Jan. 14, 2005 (JP) ............................. 2005-007796

(51) Int. Cl.
*G01M 15/00* (2006.01)

(52) U.S. Cl. .................................. 73/119 A
(58) Field of Classification Search ....... 73/116–119 A
See application file for complete search history.

(56) References Cited

U.S. PATENT DOCUMENTS 5,275,144 A * 1/1994 Gross ........................ 123/520
5,319,921 A * 6/1994 Gopp ........................... 60/274
5,445,019 A * 8/1995 Glidewell et al. .......... 73/119 A
5,499,538 A * 3/1996 Glidewell et al. .......... 73/119 A
5,535,621 A * 7/1996 Glidewell et al. .......... 73/119 A
6,817,233 B1 * 11/2004 Toiyama et al. .......... 73/119 A

FOREIGN PATENT DOCUMENTS

JP          6-278505 A     10/1994

* cited by examiner

*Primary Examiner*—Edward Lefkowitz
*Assistant Examiner*—Jermaine Jenkins
(74) *Attorney, Agent, or Firm*—Sughrue Mion, PLLC

(57) ABSTRACT

A fuel flow rate measuring apparatus for an internal combustion engine is capable of achieving cost reduction as well as measuring the flow rate of fuel with high accuracy over an entire fuel flow rate range. The apparatus includes an injection pulse width detection part for detecting an injection pulse width to drive injectors, an engine speed detection part for detecting the rotational speed of the engine, an injector driving frequency detection part for detecting an injector driving frequency per revolution of the engine from the rotational speed, a fuel injection amount characteristic setting part for setting at least one fuel injection amount characteristic corresponding to the injection pulse width, and a fuel flow rate detection part for detecting the flow rate of fuel per unit time from the injection pulse width, the injector driving frequency, and the fuel injection amount characteristic.

5 Claims, 4 Drawing Sheets

FIG. 4

FUEL INJECTION AMOUNT (FLOW RATES OF FUEL Vpsj)
CHARACTERISTICS CF CORRESPONDING TO INJECTION PULSE WIDTHS Tij

| Tij [msec] | 0.010ms | 0.020ms | 0.050ms | 0.100ms | 0.200ms | 0.500ms | 1.000ms | 2.000ms | 3.000ms | 5.000ms |
|---|---|---|---|---|---|---|---|---|---|---|
| Vpsj [mm³/ms] | 0 | 0 | 0 | 0 | 6 | 7 | 10 | 10 | 10 | 8 |

# FUEL FLOW RATE MEASURING APPARATUS FOR AN INTERNAL COMBUSTION ENGINE

BACKGROUND OF THE INVENTION

1. Field of the Invention

The present invention relates to a fuel flow rate measuring apparatus for an internal combustion engine of a vehicle, a ship or the like, and in particular, to a technique to achieve cost reduction as well as to improve reliability.

2. Description of the Related Art

In known fuel flow rate measuring apparatuses for internal combustion engines, injection pulse widths (the number of drivings or drive frequency of injectors) are detected and added up or integrated, and an amount of fuel injected within an appropriate period of time (the flow rate of fuel per unit time) is calculated from a predetermined constant (unique fuel injection amount characteristic constant) (for instance, see a first patent document: Japanese patent application laid-open No. H6-278505).

In addition, in known fuel flow rate measuring apparatuses for marine internal combustion engines, fuel piping dedicated for measurements of the flow rate of fuel is arranged to extend from internal combustion engine fuel piping at the back side of the hull of a ship up to a fuel flow meter on an instrument panel of a cockpit at the front side of the hull.

In the known fuel flow rate measuring apparatuses for internal combustion engines, only a single parameter (constant) matched for the normally used range is provided for the fuel injection amount characteristic per drive time of each injector, which is not necessarily a linear characteristic over the entire flow rate range. As a result, there is the following problem, for example. That is, there arises a mismatch for the fuel injection amount characteristic at low flow rates (when the width of an injection pulse is short), so errors might occur in the flow rate of fuel measured at the time of low flow rates.

In addition, the existence of piping dedicated for use with the fuel flow rate measuring apparatus results in the following problems. That is, installation man-hours and costs increase, and reliability is reduced due to bending of the piping, etc.

SUMMARY OF THE INVENTION

Accordingly, the present invention is intended to obviate the problems as referred to above, and has for its object to obtain a fuel flow rate measuring apparatus for an internal combustion engine which is capable of making unnecessary special sensors, etc., for cost reduction, as well as improving reliability in measurements to enable highly accurate measurements of the flow rate of fuel over an entire fuel flow rate range.

A fuel flow rate measuring apparatus for an internal combustion engine according to the present invention includes: an injection pulse width detection part that detects an injection pulse width to drive injectors of the internal combustion engine; an engine speed detection part that detects a rotational speed of the internal combustion engine; an injector driving frequency detection part that detects an injector driving frequency per revolution of the internal combustion engine from the rotational speed; a fuel injection amount characteristic setting part that sets at least one fuel injection amount characteristic corresponding to the injection pulse width; and a fuel flow rate detection part that detects a flow rate of fuel per unit time from the injection pulse width, the injector driving frequency, and the fuel injection amount characteristic.

According to the present invention, by using the fuel injection amount characteristic (per injector drive time) corresponding to the injection pulse width, it is possible to achieve cost reduction as well as to measure the flow rate of fuel over the entire fuel flow rate range in a highly accurate manner.

The above and other objects, features and advantages of the present invention will become more readily apparent to those skilled in the art from the invention taken in conjunction with the accompanying drawings.

BRIEF DESCRIPTION OF THE DRAWINGS

FIG. 1 is a block diagram showing the schematic construction of a fuel flow rate measuring apparatus for an internal combustion engine according to a first embodiment of the present invention, wherein.

FIG. 4 is an explanatory view illustrating a concrete example of the fuel injection amount characteristic of a fuel injection amount characteristic setting part in FIG. 2.

DESCRIPTION OF THE PREFERRED EMBODIMENT

Hereinafter, a preferred embodiment of the present invention will be described in detail while referring to the accompanying drawings.

Embodiment 1

Figure 1:
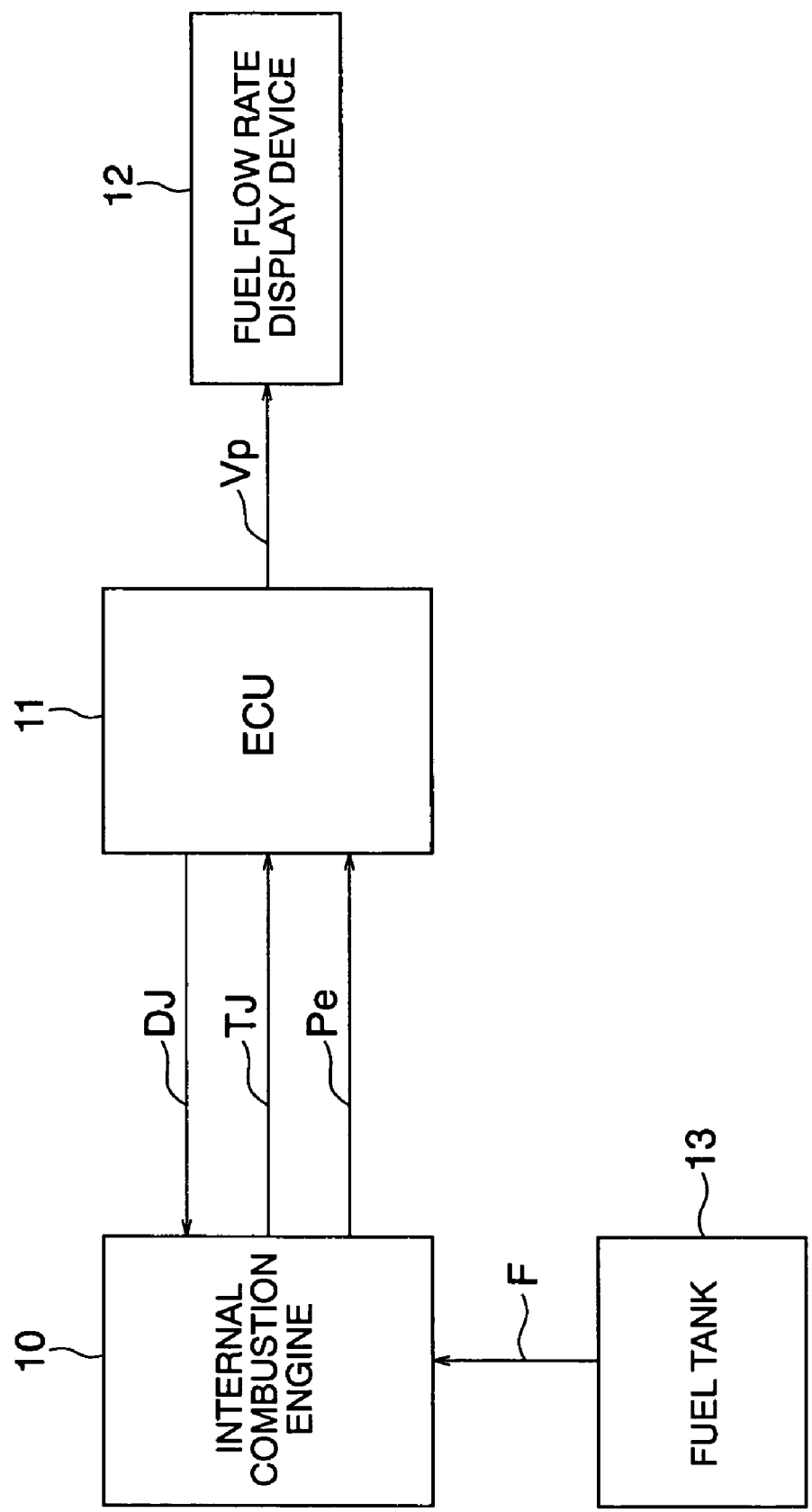
Figure 2:
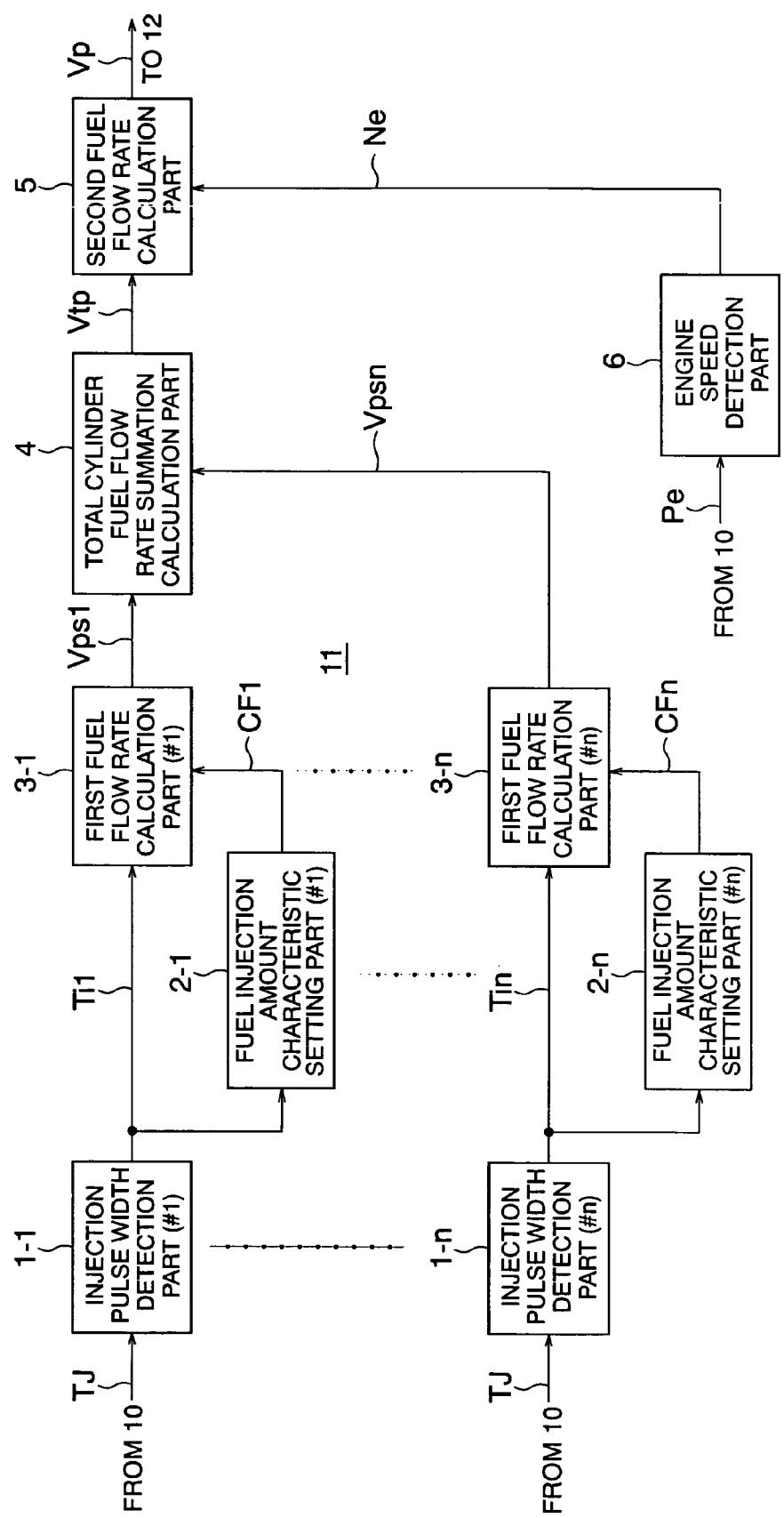
FIG. 2 is a block diagram showing the functional construction of an ECU in FIG. 1.

FIG. 1 is a block diagram that shows the schematic construction of a fuel flow rate measuring apparatus for an internal combustion engine according to a first embodiment of the present invention, wherein the apparatus is illustrated in conjunction with the entire system of the internal combustion engine (hereinafter also referred to as an engine). FIG. 2 is a block diagram that illustrates the functional construction of an ECU in FIG. 1.

In FIG. 1, an internal combustion engine 10 is provided with an ECU engine control unit) 11 for controlling the injection of fuel, ignition timing, etc., of the internal combustion engine 10, a fuel flow rate display device 12 for displaying the flow rate of fuel, and a fuel tank 13 for supplying fuel F to the internal combustion engine 10. In addition, the internal combustion engine 10 is also provided with various kinds of sensors (not shown) that detect the operating condition of the internal combustion engine in and generate detection signals (operating condition information), which are input to the ECU 11.

The ECU 11 generates an injector drive signal DJ for injectors (not shown) and an ignition signal for spark plugs (not shown) in accordance with the operating condition of the internal combustion engine 10, and inputs them to the internal combustion engine 10. Also, the ECU 11 calculates the flow rate of fuel per unit time Vp (to be described later) based on an injection timing signal TJ input from the internal combustion engine 10 and an engine speed signal Pe from a rotation sensor (not shown) mounted on the internal combustion engine 10, and makes it displayed by the fuel flow rate display device 12.

An appropriate amount of fuel F corresponding to the engine operating condition is supplied from the fuel tank 13 to the internal combustion engine 10 at appropriate timing. The ECU 11 calculates the amount of fuel to be injected, fuel injection timing, etc., corresponding to the engine operating condition in accordance with prescribed programs stored beforehand, and inputs the injector drive signal DJ to the internal combustion engine 10 thereby to drive the injectors. At the same time, the ECU 11 executes a measurement program (to be described later) for measuring the flow rate of fuel.

In FIG. 2, the ECU 11 includes injection pulse width detection parts 1-1 through 1-n (hereinafter referred to generally as "injection pulse width detection parts 1") provided corresponding to the number of cylinders n (#1 through #n) of the internal combustion engines 10, fuel injection amount characteristic setting parts 2-1 through 2-n (hereinafter referred to generally as "fuel injection amount characteristic setting parts 2") provided corresponding to the number of cylinders n, first fuel flow rate calculation parts 3-1 through 3-n (hereinafter referred to as "first fuel flow rate calculation part 3") provided corresponding to the number of cylinders n, a total cylinder fuel flow rate summation calculation part 4, a second fuel flow rate calculation part 5, and an engine speed detection part 6.

The first fuel flow rate calculation part 3, the total cylinder fuel flow rate summation calculation part 4, and the second fuel flow rate calculation part 5 together constitute a fuel flow rate detection part for detecting the flow rate of fuel per unit time Vp.

The engine speed detection part 6 detects the rotational speed Ne of the internal combustion engine 10 from the engine speed signal Pe, and inputs it to the second fuel flow rate calculation part 5.

The second fuel flow rate calculation part 5 constitutes, in association with the first fuel flow rate calculation part 3 and the total cylinder fuel flow rate summation calculation part 4, an injector driving frequency detection part, which detects the injector driving frequency (the number of times of driving the injectors) per revolution Ni of the internal combustion engine 10 from the rotational speed Ne.

Here, note that the injector driving frequency per sampling interval (main period) Ni is obtained from the engine rotational speed Ne detected every time. That is, the injector driving frequency per revolution Ni can be uniquely obtained though it varies according to two-stroke engines or four-stroke engines. However, the injector driving frequency Ni will be decreased by the cylinder stop frequency (the number of times of stopping the cylinders) during cylinder stop control.

The injection pulse width detection part 1 detects injection pulse widths Ti1 through Tin (hereinafter referred to generally as "injection pulse widths Tij") for driving the injectors (not shown) for the cylinders, respectively, of the internal combustion engine 10, and inputs them to the first fuel flow rate calculation parts 3 corresponding to the cylinders, respectively.

The fuel injection amount characteristic setting part 2 sets at least one fuel injection amount characteristics CF1 through CFn (hereinafter referred to generally as "fuel injection amount characteristics CFj") corresponding to the injection pulse widths Tij, and inputs them to the first fuel flow rate calculation parts 3 corresponding to the individual cylinders, respectively.

The first fuel flow rate calculation part 3 calculates the flow rates of fuel Vps1 through Vpsn per sampling interval (main processing period, e.g., 10 msec) of the injection pulse widths Tij (hereinafter referred to generically as, "flow rates of fuel Vpsj") based on the injection pulse widths Tij and the fuel injection amount characteristics CFj.

The total cylinder fuel flow rate summation calculation part 4 sums up the flow rates of fuel Vpsj from the first fuel flow rate calculation part 3 to calculate the sum of all the cylinder fuel flow rates per sampling interval Vtp of the injection pulse widths Tij.

The second fuel flow rate calculation part 5 detects, in association with the first fuel flow rate calculation part 3, the total cylinder fuel flow rate summation calculation part 4 and the engine speed detection part 6, the flow rate of fuel per unit time Vp from the sum total of all the cylinder fuel flow rates Vtp and the rotational speed Ne, and outputs it to the fuel flow rate display device 12.

That is, the fuel flow rate detection part comprising the first fuel flow rate calculation part 3, the total cylinder fuel flow rate summation calculation part 4 and the second fuel flow rate calculation part 5 serves to detect the flow rate of fuel per unit time Vp from the injection pulse widths Tij, the fuel injection amount characteristics CFj corresponding to the injection pulse widths Tij, and the injector driving frequency Ni, and make the thus detected flow rate of fuel Vp displayed by the fuel flow rate display device 12.

Hereinafter, a fuel flow rate measuring operation according to the first embodiment of the present invention will be described while referring to FIG. 3 together with FIG. 1 and FIG. 2. FIG. 4 is an explanatory view that illustrates a concrete example of the fuel injection amount characteristics CF, wherein the flow rates of fuel Vpsj [mm$^3$/ms] that are set are shown as map data in accordance with the injection pulse widths Tij (injector drive times) [msec]. The map data of FIG. 4 is stored in the fuel injection amount characteristic setting parts 2 in the ECU 11.

Figure 3:
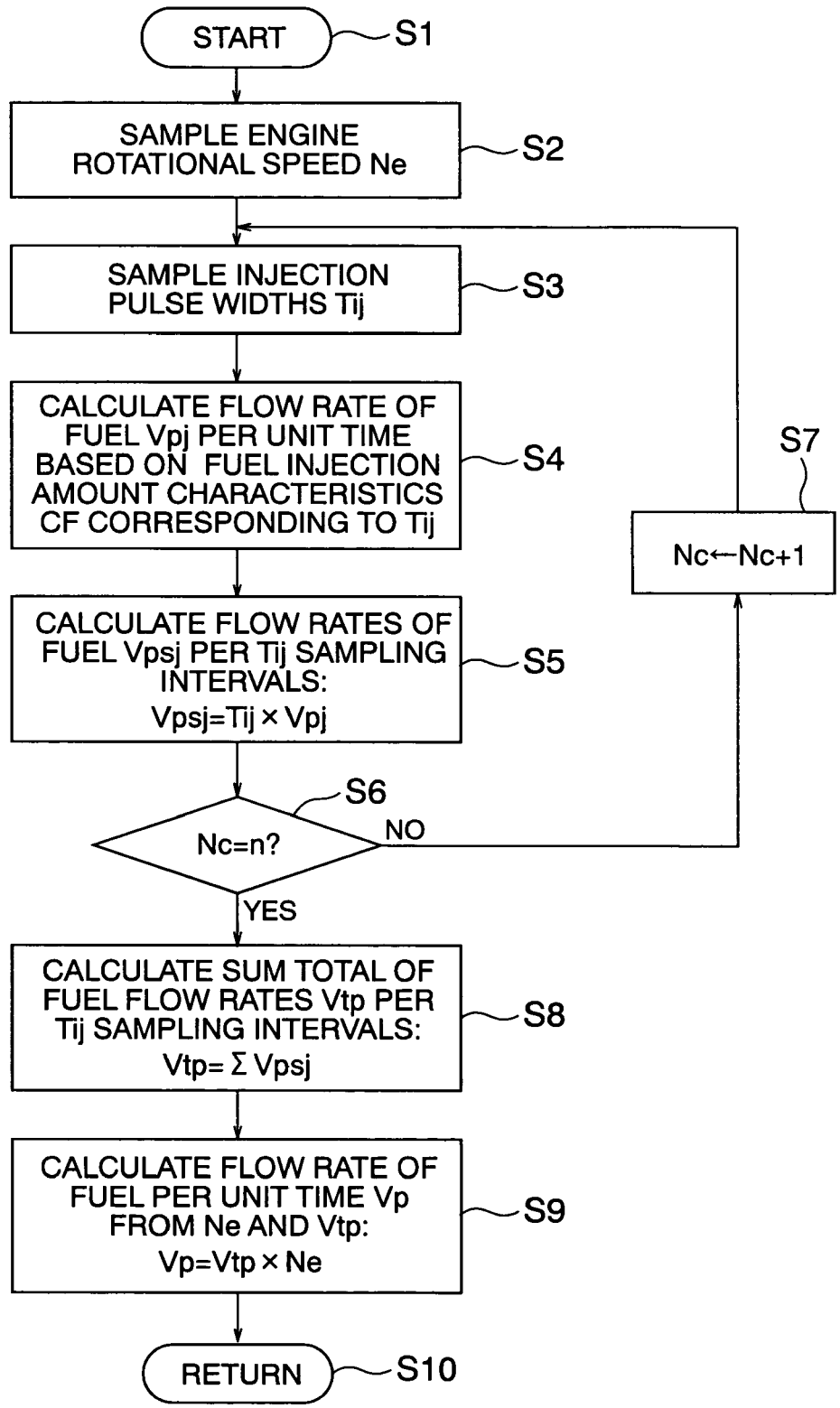
FIG. 3 is a flow chart illustrating a fuel flow rate measuring operation according to the first embodiment of the present invention.

The processing routine of FIG. 3 is executed at a predetermined period in the ECU 11.

In FIG. 3, first of all, when the fuel flow rate measurement processing starts (step S1), the engine rotational speed Ne is sampled (read out from a RAM) based on the engine speed signal Pe by means of the engine speed detection part 6 (step S2).

Subsequently, the injection pulse widths Tij are sampled (read out from the RAM) by means of the injection pulse width detection parts 1 (step S3), and the flow rate of fuel per unit time (injector drive time) Vpj is calculated from the fuel injection amount characteristics CF (the fuel flow rate map) of FIG. 4 by means of the fuel injection amount characteristic setting parts 2 by using the injection pulse widths Tij (step S4). Here, note that "j" corresponds to the cylinder number.

In addition, the flow rates of fuel per injection pulse width sampling interval (per main period) Vpsj are calculated from the following expression (1) by means of the first fuel flow rate calculation part 3 (step S5).

$$Vpsj = Tij \times Vpj \qquad (1)$$

Then, it is determined whether a counter value Nc corresponding to cylinder number j has reached the number of cylinders n (step S6), and when determined as Nc<n (that is, NO), the counter value Nc is incremented (step S7), and a return to step S3 is performed, so that the above-mentioned processing is repeatedly executed with respect to the following cylinder.

Here, note that the counter value Nc is cleared to "0" in advance at the start of the processing of FIG. 3 (step S1). That is, the above steps S3 through S5 are executed over the frequency or the number of times n corresponding to the number of cylinders, and the control flow proceeds to the next step S8 when all the flow rates of fuel Vpsj for the individual cylinders have been obtained.

On the other hand, when it is determined as Nc=n in step S6 (that is, YES), the sum total of all the cylinder fuel flow rates Vtp per sampling interval (each main period) of the injection pulse widths Tij is calculated by the total cylinder fuel flow rate summation calculation part 4 according to the following expression (2) (step S8).

$$Vtp = \Sigma Vpsj \qquad (2)$$

Finally, the flow rate of fuel per unit time Vp is calculated from the engine rotational speed Ne and the sum total of the fuel flow rates Vtp by means of the second fuel flow rate calculation part 5 according to the following expression (3) (step S9), and the processing routine of FIG. 3 is terminated (step S10).

$$Vp = Vtp \times Ne \qquad (3)$$

Hereinafter, the flow rate of fuel Vp calculated by the ECU 11 is sent to the fuel flow rate display device 12 so that it is displayed by the fuel flow rate display device 12.

As described above, according to the first embodiment of the present invention, by using the at least one fuel injection amount characteristics CFj corresponding to the injection pulse widths Tij (injector drive time), and by adjusting them to the injector characteristic that is not necessarily linear over the entire flow rate range, it is possible to measure the flow rate of fuel over the entire fuel flow rate range without provision of an special fuel flow meter (sensor, etc.) to detect the flow rate of fuel Vp while free from the influence of environmental changes.

In addition, by sending the flow rate of fuel Vp from the ECU 11 to the fuel flow rate display device 12, it is possible to easily display the flow rate of fuel without provision of any special piping for detection of the flow rate of fuel. Besides, since any special piping dedicated for use with a fuel flow meter, etc., is made unnecessary, it is possible to reduce or eliminate installation man-hours and parts costs for such piping or the like. Moreover, since no mechanical parts are required for such piping, there will be no fear that that piping might be bent, disconnected or broken, thus making it possible to further improve reliability.

As the processing associated with the step S3 in FIG. 3, the injection pulse width detection parts 1 detect the injection pulse widths Tij at each injection timing, whereby it is possible to measure the flow rate of fuel at further improved accuracy, including an amount of fuel asynchronously injected (used for increased correction of the fuel flow rate) at the time of acceleration.

Further, the fuel injection amount characteristic setting parts 2 set individual fuel injection amount characteristics CFj for the cylinders, respectively, in accordance with the injection pulse widths Tij, and also set them in such a manner that the individual fuel injection amount characteristics CFj are switched so as to correspond to the respective operating conditions in accordance with a specific fuel pressure, a specific engine temperature and the like obtained from the various kinds of sensors. As a result, differences in the injector characteristics of the respective cylinders can be absorbed.

Furthermore, in consideration of the fact that the characteristic of each injector is not necessarily linear, the fuel injection amount characteristic setting parts 2 set the axial intervals of the injection pulse widths Tij to be not linear but at inequal intervals in the fuel injection amount characteristics CF of FIG. 4. By setting the axial intervals finely in a low flow rate region and in a high flow region, but coarsely in a regular or normal region, as shown in FIG. 4, it is possible to set the injector characteristics with the use of a smaller amount of memory. Here, note that the axial intervals are not limited to inequal axial increments as in FIG. 4, but equal axial increments may be employed.

In addition, the fuel injection amount characteristic setting parts 2 set the flow rate of fuel Vpj of a predetermined injection pulse width (e.g., 0.050 ms) or less to "0" in the fuel injection amount characteristics CF of FIG. 4, so that errors in the injection amounts in an extremely short time can be reduced. Though fuel is not generally injected in actuality when injectors are driven in an extremely short time because of mechanical ability of the injectors, setting the flow rate of fuel Vpj of the predetermined injection pulse width (extremely short time) or less to "0" serves to reduce errors in the amounts of fuel injected in an extremely short period of time, thus making it possible to measure the flow rate of fuel with much higher accuracy.

Although the concrete construction of the internal combustion engine 10 has not been referred to above, a two-stroke engine may be applied as the internal combustion engine 10. In the case of such a two-stroke engine, it is necessary to inject lubrication oil into the cylinders of the two-stroke engine, for example, even at the time of cylinder stop control, so the injectors are not completely stopped but driven in an extremely short period of time. In this case, it is possible to measure the flow rate of fuel with high accuracy by appropriately setting the property in a very short time range of the fuel injection amount characteristics CFj. That is, though fuel is not injected in actuality in the driving of the injectors for an extremely short period of time, the calculated injection pulse widths Tij are summed up to add errors, and besides, cylinder stop control is frequently used in such engine operating conditions as idling operation, over rotation, etc. Accordingly, it is necessary to set the property in the very short time range of the fuel injection amount characteristics CFj in an appropriate manner.

Moreover, no particular use of the internal combustion engine 10 has been referred to above, the internal combustion engine 10 may be applied to as an outboard engine. In the case of such an outboard engine, in an engine operating condition in which an idling range and a fully opened over-rotation range are particularly frequently used (i.e., in an engine operating condition in which cylinder stop control is frequently used with the injectors being not completely stopped but driven for an extremely short period of time), it is possible to measure the flow rate of fuel with high accuracy by appropriately setting the fuel injection amount characteristics CFj in a very short range.

While the invention has been described in terms of a preferred embodiment, those skilled in the art will recognize that the invention can be practiced with modifications within the spirit and scope of the appended claims.

What is claimed is:

1. A fuel flow rate measuring apparatus for an internal combustion engine comprising:
    an injection pulse width detection part that detects an injection pulse width to drive injectors of said internal combustion engine;
    an engine speed detection part that detects a rotational speed of said internal combustion engine;

an injector driving frequency detection part that detects an injector driving frequency per revolution of said internal combustion engine from said rotational speed;

a fuel injection amount characteristic setting part that sets at least one fuel injection amount characteristic corresponding to said injection pulse width; and a fuel flow rate detection part that detects a flow rate of fuel per unit time from said injection pulse width, said injector driving frequency, and said fuel injection amount characteristic.

2. The fuel flow rate measuring apparatus for an internal combustion engine as set forth in claim 1, wherein said fuel flow rate detection part detects said flow rate of fuel per unit time at each injection timing of said internal combustion engine.

3. The fuel flow rate measuring apparatus for an internal combustion engine as set forth in claim 1, wherein said fuel injection amount characteristic setting part is provided for each cylinder of said internal combustion engine.

4. The fuel flow rate measuring apparatus for an internal combustion engine as set forth in claim 1, wherein said fuel injection amount characteristic setting part sets an injection amount characteristic for a predetermined injection pulse width or less to 0.

5. The fuel flow rate measuring apparatus for an internal combustion engine as set forth in claim 1, further comprising a display part that displays said flow rate of fuel per unit time.

* * * * *